United States Patent [19]
Wilcox

[11] Patent Number: 5,797,416
[45] Date of Patent: Aug. 25, 1998

[54] FAUCET AND WATER PIPE FREEZE-PROTECTION DEVICE

[76] Inventor: John D. Wilcox, 775 Spring Hill Rd., Talladega, Ala. 35160

[21] Appl. No.: 778,368

[22] Filed: Jan. 2, 1997

[51] Int. Cl.⁶ .................................. E03B 7/12; F16L 55/00
[52] U.S. Cl. .......................... 137/60; 137/79; 137/301; 138/28; 138/32
[58] Field of Search .......................... 137/59, 60, 61, 137/62, 301, 302, 79; 237/80; 138/32, 35, 34, 28, 27; 236/99 R, 99 B, 99 J, 101 R, 103; 374/187

[56] References Cited

U.S. PATENT DOCUMENTS

| | | | |
|---|---|---|---|
| D. 370,055 | 5/1996 | Mathison | D23/260 |
| 3,369,556 | 2/1968 | Allderdice | 137/62 |
| 3,380,464 | 4/1968 | Arterbury et al. | 137/60 |
| 3,446,226 | 5/1969 | Canterbury | 137/62 |
| 3,511,253 | 5/1970 | Ljutov | 137/60 |
| 4,437,481 | 3/1984 | Chamberlin et al. | 137/60 |
| 4,484,594 | 11/1984 | Alderman | 137/62 |
| 4,852,601 | 8/1989 | Chamberlin | 137/60 |

*Primary Examiner*—George L. Walton
*Attorney, Agent, or Firm*—Jacobson, Price, Holman & Stern, PLLC

[57] ABSTRACT

A device which protects water faucets and water pipes to which they are attached from freezing or breaking due to freezing of water contained therein. The device comprises a closed-ended nipple which is axially and/or radially expandable to accommodate freezing of water contained therein when the nipple is attached to the open end of a faucet or sillcock.

17 Claims, 1 Drawing Sheet

FAUCET AND WATER PIPE FREEZE-PROTECTION DEVICE

FIELD OF THE INVENTION

Water pipes and faucets exposed to freezing temperatures are subject to bursting when ice formed therein sufficiently expands. A freeze-protecting nipple can protect such faucets and pipes.

BACKGROUND

Water in water pipes and faucets are subject to freezing, particularly in the winter time in areas which are subject to temperatures considerably below freezing. As water expands when it freezes, faucets and water pipes in which freezing water occurs are often subject to severe damage, including bursting.

Although a small drain flushing expandable plug is shown in the Design Patent No. 370,055, it does not appear that such would serve the instant purpose.

SUMMARY OF THE INVENTION

A closed-ended nipple has a mated end for secure attachment to a faucet or water pipe and is composed of an expandable material, which, however, is strong enough to withstand water pressure in a faucet or water pipe without significantly expanding. The nipple is expandable upon freezing of water retained therein, as well as the water in the faucet and adjoining pipes.

An object of this invention is to protect from freezing damage faucets and water pipes which are exposed to below freezing temperatures.

DETAILS

The subject nipple is hollow. It has an open end and a closed end at opposite ends of an axis. It is expandable axially and/or radially. The open end is preferably internally threaded at one end and closed at the other. Threads of the threaded end match external threads on the open end of a faucet, sillcock or hosecock, to which it is designed to be attached. Optionally, any quick attach/detach structure on the open end can replace the internal threads as long as matching structure is provided by the open end of a corresponding faucet, sillcock or hosecock.

The nipple is composed of expandable material which is elastic and strong enough to withstand (without significant expansion) the maximum water pressure of the faucet, sillcock or hosecock when the latter is open, but resilient enough to expand sufficiently to accommodate freezing water in the nipple, faucet and adjoining pipes.

The expression "without significant expansion" means, in context, that, after the nipple is filled with water at the maximum available water pressure (with the faucet at the fully-open position), the expandable material is still sufficiently expandable to accommodate further expansion caused by freezing of all the water within the nipple, faucet and adjoining pipes.

The nipple is composed of any suitable material, such as rubber, synthetic rubber or elastomeric plastic material. Suitable materials having required properties, such as ethylene copolymers, e.g. ethylene-vinyl acetate and ethylene-ethyl acrylate copolymers, are well known, and the particular expandable material employed is not crucial to this invention other than its ability to withstand the water pressure to which it is subjected and still be effectively expandable (at temperatures as low as −15° C. or even lower) to accommodate the freezing of water contained therein.

When water freezes, it expands. Expansion due to freezing can be radial, axial or a combination thereof. Such expansion has sufficient force to burst faucets and water pipes containing the freezing water. As expansion occurs within a surrounding object which provides the least resistance to expansion, the subject nipple accommodates the expansion and thus protects the faucet and water pipe to which it is attached.

With reference to the drawings, a nipple 1 in unexpanded condition is attached to the open end of a faucet 2. The nipple has a closed end 3 and an open end 4, with means to secure it to the open end of the faucet.

Figure 1:
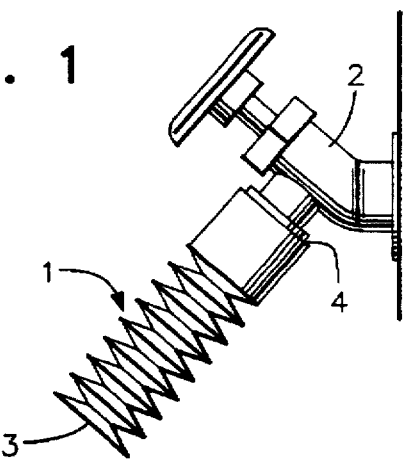
FIG. 1 is a plan view of one embodiment of an expandable nipple attached to a water faucet in non-expanded form.
Figure 2:
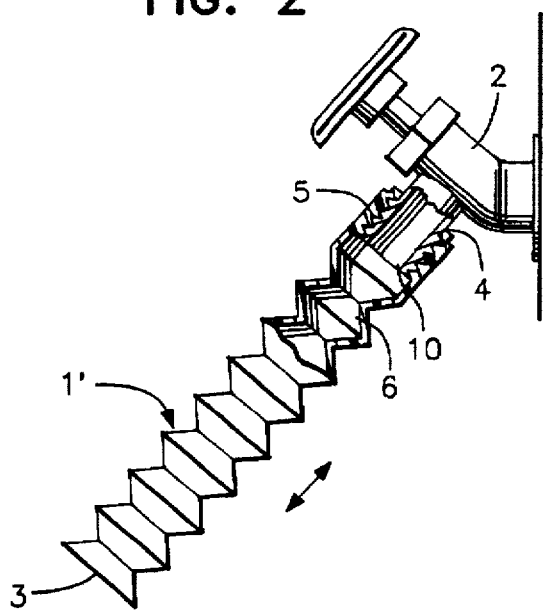
FIG. 2 is a partial cutaway plan view corresponding to FIG. 1, but with the nipple in expanded form.

FIG. 2 illustrates matching-thread means 5 for securing the open end of the nipple to the open end 10 of the faucet. FIG. 2 shows the nipple of FIG. 1 in axially-expanded condition 1'. The cutaway portion 6 of FIG. 2 also shows that the nipple is hollow.

Figure 3:
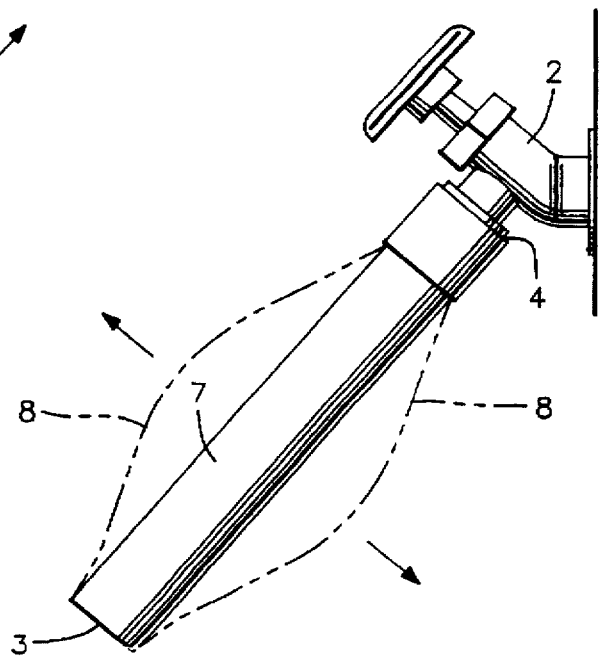
FIG. 3 is a plan view of an alternative form of expandable nipple attached to a water faucet.

FIG. 3 illustrates a different embodiment 7 of the nipple; this embodiment is primarily radially expandable on freezing of water retained therein. The dotted lines 8 indicate a projected shape for expansion due to freezing of contained water. Further axial expansion is also possible with this embodiment.

Throughout the drawings similar numerals depict similar parts of the respective embodiments. The actual shape of the nipple is not limited to cylindrical forms, such as those illustrated; it could be, e.g., spherical.

In any case, upon thawing of ice within each embodiment, the nipple returns to its pre-expanded state, i.e. the state of the nipple immediately prior to freezing of water contained therein.

Some expansion of the nipple upon opening the faucet to its full extent is not precluded; however, the nipple must have a sufficient capacity (inner volume) and be sufficiently further expandable (at a pressure significantly less than that required to damage a faucet or water pipe to which it is attached) to accommodate freezing of all of the water contained therein.

Although the material from which the nipple is prepared, e.g., by molding, is sufficiently strong to withstand the entire force of water pressure withheld by the faucet without substantial expansion, it is sufficiently resilient at encountered freezing temperatures to expand under the high pressure of freezing water. After ice contained therein melts and the pressure recedes, the nipple returns to its original condition and is ready for another freeze, thus preventing bursting of the faucet or water line to which the faucet is attached.

Although air remaining in the nipple after the faucet is turned on presents a further factor, such factor can be eliminated by filling the nipple with water prior to attaching it to the open end of the faucet. However, any air remaining in the nipple actually adds to the efficiency of the device by allowing ice formed within the nipple to expand into the thus provided air space more freely.

The invention and its advantages are readily understood from the foregoing description. Various changes may be made without departing from the spirit and scope of the invention or sacrificing its material advantages, the forms herein before described and illustrated in the drawings being merely preferred embodiments thereof.

What is claimed is:

1. A hollow nipple composed of material a) capable of withstanding maximum pressure of water received from and retained by an open faucet and b) capable of expansion to accommodate complete freezing of water contained therein without turning off the faucet, the nipple having only one opening which is in an end provided with means for secure and water-tight direct attachment to an outlet of the faucet.

2. A combination of a water faucet secured at its outlet to a nipple of claim 1, wherein the faucet is opened and the nipple is filled with water.

3. A combination of claim 2 wherein the water within the nipple is frozen and thus has an increased volume, and the nipple is expanded to accommodate the increased volume.

4. A hollow nipple of claim 1, having an axis and two ends at opposite extremes of the axis, one end of which is closed and the other end of which is open and designed for secure attachment to a faucet, the nipple being composed of material a) capable of withstanding maximum pressure of water retained by the faucet without significant expansion and b) capable of further expansion to accommodate freezing of water contained therein.

5. A nipple of claim 4, wherein the other end is internally threaded with threads which match those of the faucet.

6. A nipple of claim 4, wherein expansion to accommodate freezing is substantially in an axial direction.

7. A nipple of claim 4, wherein expansion to accommodate freezing is substantially in a radial direction.

8. A combination of a water faucet or sillcock secured at its outlet to a nipple of claim 4, wherein the faucet is an open position and the nipple is filled with water.

9. A combination of claim 4 wherein the water within the nipple is frozen and thus has an increased volume, and the nipple is expanded to accommodate the increased volume.

10. A hollow nipple of claim 1 having an interior and two ends, one end of which is completely closed, and the interior of which, other than for at least one of water and ice, is completely empty during operation.

11. A hollow nipple of claim 1 which consists essentially of the material, an open end provided with means for secure and water-tight direct attachment to the faucet and a closed end.

12. A freeze-protection device which is a hollow nipple of claim 1, the material of which is elastic.

13. A freeze-protection device which is a hollow nipple of claim 12 in which the elastic material is capable of returning to its original unexpanded condition after frozen water contained therein melts and resulting pressure therewithin recedes.

14. A freeze-protection device which is a hollow nipple of claim 1 which is reusable without alteration.

15. A hollow nipple of claim 1 which protects at least one of an open water-conducting line and fixture to which it is attached from damage due to pressure caused by freezing.

16. A hollow nipple composed of material a) capable of withstanding maximum pressure of water received from and retained by an open sill cock and b) capable of expansion to accommodate complete freezing of water contained therein without turning off the faucet, the nipple having only one opening which is in an end provided with means for secure and water-tight attachment to an outlet of the sill cock.

17. A hollow nipple of claim 16, having an axis and two ends at opposite extremes of the axis, one end of which is closed and the other end of which is open and designed for secure attachment to a sill cock, the nipple being composed of material (a) capable of withstanding maximum pressure of water retained by the sill cock without significant expansion and (b) capable of further expansion to accommodate freezing of water contained therein.

* * * * *